United States Patent
Nakami et al.

(10) Patent No.: US 7,884,863 B2
(45) Date of Patent: Feb. 8, 2011

(54) IMAGE NOISE REDUCTION DEVICE AND IMAGE NOISE REDUCTION METHOD

(75) Inventors: Yoshihiro Nakami, Nagano-ken (JP); Makoto Fujino, Nagano-ken (JP)

(73) Assignee: Seiko Epson Corporation, Tokyo (JP)

(*) Notice: Subject to any disclaimer, the term of this patent is extended or adjusted under 35 U.S.C. 154(b) by 1308 days.

(21) Appl. No.: 10/486,470

(22) PCT Filed: Oct. 9, 2002

(86) PCT No.: PCT/JP02/10504

§ 371 (c)(1),
(2), (4) Date: Feb. 9, 2004

(87) PCT Pub. No.: WO03/036938

PCT Pub. Date: May 1, 2003

(65) Prior Publication Data

US 2004/0212692 A1 Oct. 28, 2004

(30) Foreign Application Priority Data

Oct. 9, 2001 (JP) .............................. 2001-311825
Sep. 20, 2002 (JP) .............................. 2002-274836

(51) Int. Cl.
*H04N 5/217* (2006.01)
(52) U.S. Cl. .................................................. 348/241
(58) Field of Classification Search ............ 348/231.99, 348/241, 224.1, 296, 297; 382/270
See application file for complete search history.

(56) References Cited

U.S. PATENT DOCUMENTS

| | | | |
|---|---|---|---|
| 5,610,654 A * | 3/1997 | Parulski et al. ............ 348/229.1 |
| 5,638,184 A * | 6/1997 | Fujimoto et al. ............ 386/112 |
| 5,696,850 A | 12/1997 | Parulski et al. |
| 5,963,271 A | 10/1999 | Ikeda |
| 6,011,547 A * | 1/2000 | Shiota et al. ................ 382/254 |
| 6,573,927 B2 * | 6/2003 | Parulski et al. ................ 348/32 |
| 6,813,389 B1 * | 11/2004 | Gindele et al. .............. 382/274 |
| 7,065,255 B2 * | 6/2006 | Chen et al. .................. 382/260 |
| 7,133,070 B2 * | 11/2006 | Wheeler et al. .......... 348/223.1 |

(Continued)

FOREIGN PATENT DOCUMENTS

EP 0 838 939 4/1998

(Continued)

OTHER PUBLICATIONS

Abstract of Japanese Patent Publication No. 2000-066296, Pub. Date: Mar. 3, 2000, Patent Abstracts of Japan.

(Continued)

*Primary Examiner*—Jason Chan
*Assistant Examiner*—Gary C Vieaux
(74) *Attorney, Agent, or Firm*—Martine Penilla & Gencarella, LLP

(57) ABSTRACT

A CPU 200 reads out an image file GF from a memory card MC and stores the read out image file GF temporarily in an RAM 210. The CPU 200 acquires shooting information EI from the read out image file GF and determines the noise reduction level according to the ISO speed. When the ISO speed or the shutter speed exceeds a predetermined value, the CPU 200 increases the noise reduction level and executes noise reduction process.

7 Claims, 10 Drawing Sheets

U.S. PATENT DOCUMENTS

| | | | | |
|---|---|---|---|---|
| 7,136,100 B1 * | 11/2006 | Kato et al. | ................... | 348/241 |
| 2003/0124589 A1 * | 7/2003 | Piper | ............................ | 435/6 |

FOREIGN PATENT DOCUMENTS

| | | | |
|---|---|---|---|
| EP | 1 109 130 | | 6/2001 |
| EP | 1 111 907 | | 6/2001 |
| JP | 04135388 A | * | 5/1992 |
| JP | 10-191246 | | 7/1998 |
| JP | 11-341501 | | 12/1999 |
| JP | 2000-066296 | | 3/2000 |
| JP | 2000-196916 | | 7/2000 |
| JP | 2000-209425 | | 7/2000 |
| JP | 2000-350144 | | 12/2000 |
| JP | 2000-354179 | | 12/2000 |
| JP | 2001-078057 | | 3/2001 |
| JP | 2001-094834 | | 4/2001 |
| JP | 2001094834 A | * | 4/2001 |
| JP | 2001-144996 | | 5/2001 |
| JP | 2001-177731 | | 6/2001 |
| JP | 2001-211318 | | 8/2001 |
| JP | 2001-218105 | | 8/2001 |
| JP | 2001-352474 | | 12/2001 |
| JP | 2002-101422 | | 4/2002 |

OTHER PUBLICATIONS

Abstract of Japanese Patent Publication No. 2001-078057, Pub. Date: Mar. 23, 2001, Patent Abstracts of Japan.

Abstract of Japanese Patent Publication No. 10-191246, Pub. Date: Jul. 21, 1998, Patent Abstracts of Japan.

Abstract of Japanese Patent Publication No. 2000-196916, Pub. Date: Jul. 14, 2000, Patent Abstracts of Japan.

Abstract of Japanese Patent Publication No. 2001-177731, Pub. Date: Jun. 29, 2001, Patent Abstracts of Japan.

Abstract of Japanese Patent Publication No. 2001-352474, Pub. Date: Dec. 21, 2001, Patent Abstracts of Japan.

Abstract of Japanese Patent Publication No. 2002-101422, Pub. Date: Apr. 5, 2002, Patent Abstracts of Japan.

Abstract of Japanese Patent Publication No. 11-341501, Pub. Date: Dec. 10, 1999, Patent Abstracts of Japan.

Abstract of Japanese Patent Publication No. 2000-354179, Pub. Date: Dec. 19, 2000, Patent Abstracts of Japan.

Abstract of Japanese Patent Publication No. 2001-094834, Pub. Date: Apr. 6, 2001, Patent Abstracts of Japan.

Abstract of Japanese Patent Publication No. 2001-218105, Pub. Date: Aug. 10, 2001, Patent Abstracts of Japan.

Abstract of Japanese Patent Publication No. 2000-209425, Pub. Date: Jul. 28, 2000, Patent Abstracts of Japan.

Abstract of Japanese Patent Publication No. 2001-144996, Pub. Date: May 25, 2001, Patent Abstracts of Japan.

Abstract of Japanese Patent Publication No. 2000-350144, Pub. Date: Dec. 15, 2000, Patent Abstracts of Japan.

Abstract of Japanese Patent Publication No. 2001-211318, Pub. Date: Aug. 3, 2000, Patent Abstracts of Japan.

* cited by examiner

| | PARAMETERS | VALUES |
|---|---|---|
| SHOOTING INFORMATION EI | ISO SENSITIVITY | 100 |
| | IMAGE COMPRESSION RATIO | 2/1(b/p) |
| | EXPOSURE CORRECTION | EV0.4 |
| | LIGHT SOURCE | AUTO |
| | FLASH | ON |
| | LENS FOCAL LENGTH | 7mm |
| | SHUTTER SPEED | 1sec |
| | IMAGE WIDTH | 2544 |
| | IMAGE HEIGHT | 1904 |
| | GAIN CONTROL | 2 |
| | 35 mm LENS FOCAL LENGTH | 28mm |
| | RESOLUTION IN HEIGHT OF FOCAL PLANE | 3704/1 |
| | RESOLUTION IN WIDTH OF FOCAL PLANE | 3704/1 |
| | RESOLUTION UNIT OF FOCAL PLANE | 2 |

| NOISE REDUCTION LEVEL LV | FILTER SIZE R |
|---|---|
| 1 | 3 |
| 96 | 5 |
| 127 | 9 |
| 255 | 21 |

Fig.8

IMAGE NOISE REDUCTION DEVICE AND IMAGE NOISE REDUCTION METHOD

TECHNICAL FIELD

The present invention relates to a technique of processing image data with shooting conditions of the image data.

BACKGROUND ART

Image data taken (generated) by a digital still camera (DSC) are generally recorded in the form of an image file in conformity with the Exchangeable image file format (Exif), which has been set by Japan Electronics and Information Technology Industries Association (JEITA), in a recording medium, such as a memory card. The image file in conformity with the Exif format includes image data and Exif information, which is embedded in the image data to describe shooting conditions.

The Exif information has various shooting conditions including an ISO sensitivity, use or non-use of strobe light (flash), a lens focal length, and an image compression ratio are written at respective preset positions. Analysis of the Exif information thus informs the user of under what conditions the image data have been taken.

The Exif information has mainly been used to check the shooting conditions, but has not been applied to make the shooting conditions reflected on image processing executed by a personal computer or the like. Auto adjustment of the image quality by an image processing application program may fail reproduction of the shooting environment.

DISCLOSURE OF THE INVENTION

The object of the present invention is thus to solve the problems discussed above and to execute adequate image processing for shooting conditions of image data and thereby ensure favorable results of the image processing.

A first application of the invention to attain the above and the other related objects is directed to an image processing device that utilizes a shooting condition to execute image processing of image data. This image processing device includes: an image data acquisition module that acquires image data in a file form; and an image processing module that changes a noise reduction level, which represents a degree of noise reduction, according to a shooting condition that relates to lightness of a subject of shooting and is mapped to the acquired image data, and carries out image processing of the acquired image data.

The image processing device as the first application of the invention has the image processing module that executes the image processing of the image data, based on the shooting condition relating to the lightness in shooting. The image processing is thus executable by taking into account the lightness in shooting. This arrangement ensures execution of the effective image processing to reduce the noise level, which is a lightness-related factor, and gives a desirable result of the image processing expected at the time of shooting.

In one preferable embodiment of the image processing device in the first application of the invention, the image processing module includes a shooting condition retrieval sub-module that retrieves the shooting condition that relates to the lightness of the subject of shooting and is mapped to the acquired image data. In the case of successful retrieval of the shooting condition, the image processing module changes the noise reduction level, which represents the degree of noise reduction, according to the retrieved shooting condition and carries out the image processing of the image data. This arrangement executes the image processing of the image data with the changed noise reduction level, in response to successful retrieval of the shooting condition.

In the image processing device as the first application of the invention, the shooting condition relating to the lightness of the subject of shooting may be at least one of an ISO speed, a shutter speed, a gain control level, and a CCD pixel size. The image processing module may heighten the noise reduction level with any of an increase in ISO speed, a decrease in shutter speed, an increase in gain control level, and a decrease in CCD pixel size. As is known in the art, the ISO speed (sensitivity), the shutter speed, and the CCD pixel size are closely related to the occurrence of noise. The occurrence of the noise is enhanced in general with an increase in ISO speed, a decrease in shutter speed, an increase in gain control level, or a decrease in CCD pixel size. The above arrangement thus efficiently reduces the noise occurrence.

In the image processing device as the first application of the invention, the image processing module may analyze lightness of the image data and set an initial value of the noise reduction level. This arrangement ensures execution of noise reduction, based on the lightness of the image data.

A second application of the invention is directed to an image processing device that utilizes a shooting condition to execute image processing of image data. The image processing device in the second application of the invention includes: an image data acquisition module that acquires image data in a file form; a shooting condition retrieval module that retrieves shooting conditions that relate to use or non-use of strobe light and a focal length and are mapped to the acquired image data; and an image processing module that, in the case of successful retrieval of the shooting conditions, carries out image processing of the acquired image data by utilizing the retrieved shooting conditions for background processing of a target of shooting.

The image processing device in the second application of the invention utilizes the shooting conditions relating to the use or non-use of strobe light and the focal length to execute the background processing of the target of shooting. This arrangement desirably improves unnatural output results arising in the background of the target of shooting, due to the use of strobe light.

A third application of the invention is directed to an image processing device that utilizes a shooting condition to execute image processing of image data. The image processing device in the third application of the invention includes: an image data acquisition module that acquires image data in a file form; a shooting condition retrieval module that retrieves a shooting condition that relates to an image compression ratio and is mapped to the acquired image data; and an image processing module that, in the case of successful retrieval of the shooting condition, changes a noise reduction level, which represents a degree of noise reduction, with the retrieved shooting condition and carries out image processing of the image data.

The image processing device in the third application of the invention utilizes the shooting condition relating to the image compression ratio to change the noise reduction level for execution of the image processing. This arrangement ensures adequate noise reduction for each pixel according to the image compression ratio, which is related to the noise level.

A fourth application of the invention is directed to a computer readable medium that stores an image processing program, where the image processing program utilizes at least one of an ISO speed, a shutter speed, a gain control level, and a CCD pixel size to execute image processing of image data.

The image processing program in the fourth application of the invention has: a program command that acquires image data; a program command that retrieves at least one of the ISO speed, the shutter speed, the gain control level, and the CCD pixel size mapped to the acquired image data; and a program command that, in the case of successful retrieval of at least one of the ISO speed, the shutter speed, the gain control level, and the CCD pixel size, carries out image processing of the image data to heighten a noise reduction level, which represents a degree of noise reduction, with any of an increase in ISO speed, a decrease in shutter speed, an increase in gain control level, and a decrease in CCD pixel size.

The computer readable medium storing the image processing program therein as the fourth application of the invention has the similar functions and effects to those of the image processing device in the first application of the invention. The various arrangements discussed above with regard to the image processing device in the first application of the invention are also applicable to the computer readable medium storing the image processing program therein as the fourth application of the invention.

In the computer readable medium storing the image processing program therein as the fourth application of the invention, it is preferable that the image processing analyzes lightness of the image data, sets an initial value of the noise reduction level, and changes the noise reduction level according to the retrieved shooting condition. This arrangement changes the setting of the noise reduction level, which has been specified based on the lightness of the image data, according to the shooting condition, thus ensuring adequate noise reduction for each image data.

A fifth application of the invention is directed to a computer readable medium that stores a printer control program, where the printer control program utilizes a shooting condition to generate image data, which are to be output by a printer. The printer control program in the fifth application of the invention has: a program command that obtains an image file, which includes both image data and a shooting condition; a program command that retrieves the shooting condition from the obtained image file; and a program command that, in the case of successful retrieval of the shooting condition, carries out image processing of the image data with the retrieved shooting condition.

In the case of successful retrieval of the shooting condition, the computer readable medium storing the printer control program in the fifth application of the invention executes the image processing of the image data with the retrieved shooting condition, thus giving output image data that reflects the shooting condition.

The present invention is attained by a diversity of other applications and arrangements.

BRIEF DESCRIPTION OF THE DRAWINGS

FIG. 8 is a map representing a relation between noise reduction level LV and filter size R;

BEST MODES OF CARRYING OUT THE INVENTION

The image processing device of the invention is discussed below in the following sequence in the form of some embodiments with reference to the accompanied drawings:

A. Construction of Image Processing System Including Image Processing Device

B. Image Processing Executed by Image Processing Device in First Embodiment

C. Image Processing Executed by Image Processing Device in Second Embodiment

D. Image Processing Executed by Image Processing Device in Third Embodiment

E. Image Processing Executed by Image Processing Device in Fourth Embodiment

F. Other Embodiments

Figure 1:
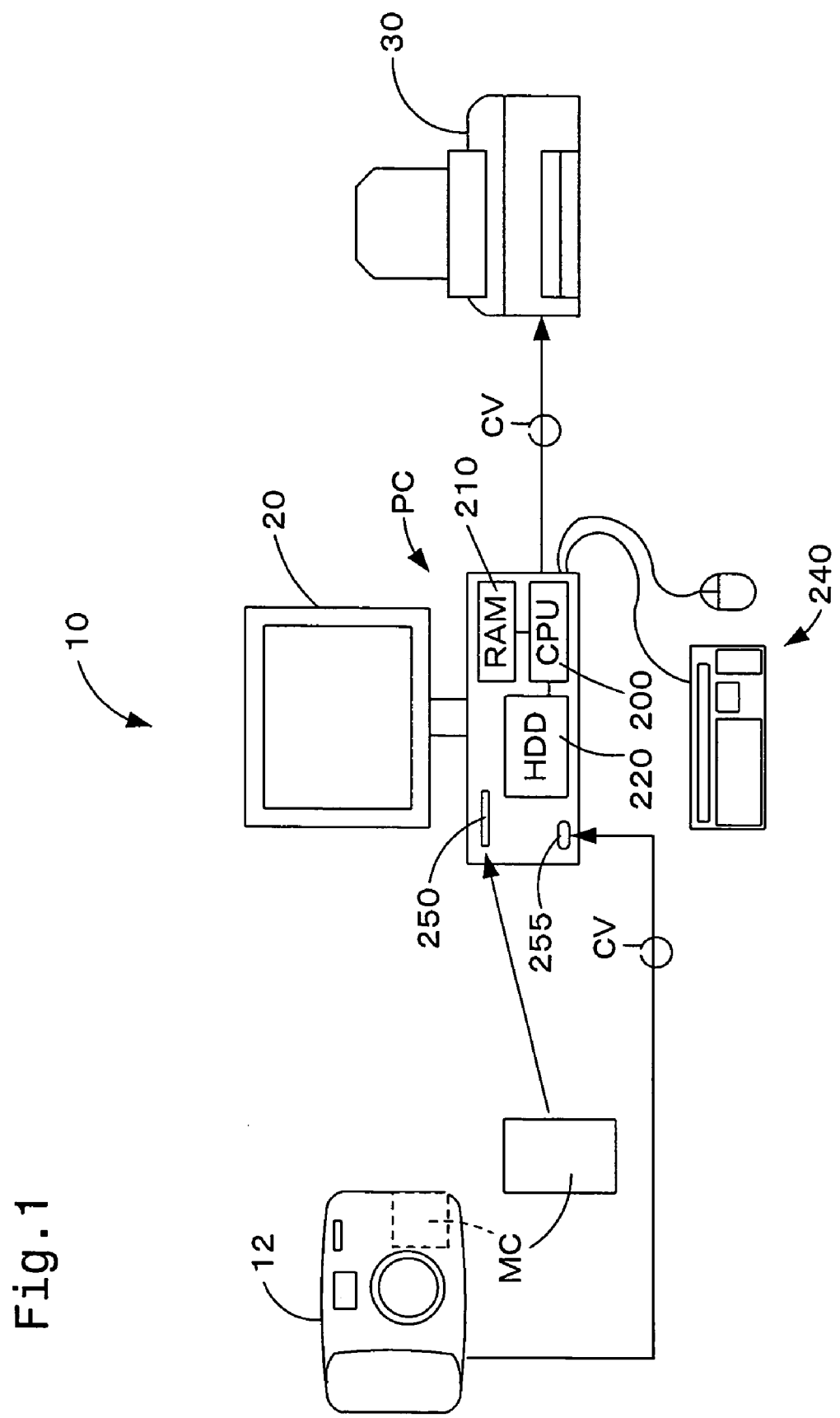
FIG. 1 illustrates an image processing system, to which an image processing device of an embodiment is applicable.

A. Construction of Image Processing System with Image Processing Device Applicable Thereto The construction of an image processing system, to which an image processing device of an embodiment is applicable, is discussed below with reference to FIG. 1. FIG. 1 illustrates the construction of an image processing system, to which an image processing device of an embodiment is applicable.

The image processing system 10 includes a digital still camera 12 functioning as an input device that generates image data with shooting conditions attached thereto, a personal computer 20 functioning as an image processing device that executes image processing of the image data generated by the digital still camera 12 as discussed later, and a color printer 30 functioning as an image output device that is set by the personal computer 20. The image data (image files), which are subject to a series of image processing executed by the image processing device of the embodiment, are input into the personal computer 20 from the digital still camera 12 via a connector cable CV or a memory card MC.

A standalone printer having image processing functions may be applied for the image processing device, instead of the personal computer 20. A display device like a CRT display, an LCD display, or a projector, in addition to or in place of the printer 30, is available as the output device. In the discussion below, the color printer 30 connecting with the personal computer 20 is used as the output device.

The personal computer 20 is a general-purpose computer and includes a CPU 200 that executes image processing programs of the invention, a RAM 210 that temporarily registers results of arithmetic operations executed by the CPU 200 and image data, a hard disk drive (HDD) 220 that stores the image processing programs, a display unit 230 that displays the results of the arithmetic operations executed by the CPU 200 and the image data, and an input device 240 like a keyboard and a mouse that is manipulated to enter commands and numerical values. The personal computer 20 also has a card slot 250 that receives the memory card MC inserted therein and an input output terminal 255 that connects with the connector cable CV from the digital still camera 12.

The digital still camera 12 activates a CCD or a photomultiplier to transform optical information into analog electric signals and uses an A/D converter to convert the obtained analog electric signals into digital signals, thereby generating digital image data. The digital image data thus generated are typically stored in the memory card MC as a memory device. The general format applied for storage of the image data in the digital still camera 12 is JPEG, although another storage format like TIFF, GIF, the BMP file format, or the RAW file format is also applicable.

The digital still camera 12 of the embodiment embeds shooting information EI, which includes multiple shooting conditions, in each image data GD and records the image data GD in the form of an Exif format image file into the memory card MC. The specifications of the Exif file have been set by Japan Electronics and Information Technology Industries Association (JEITA) and are not described here in detail.

Figures 2, 3:
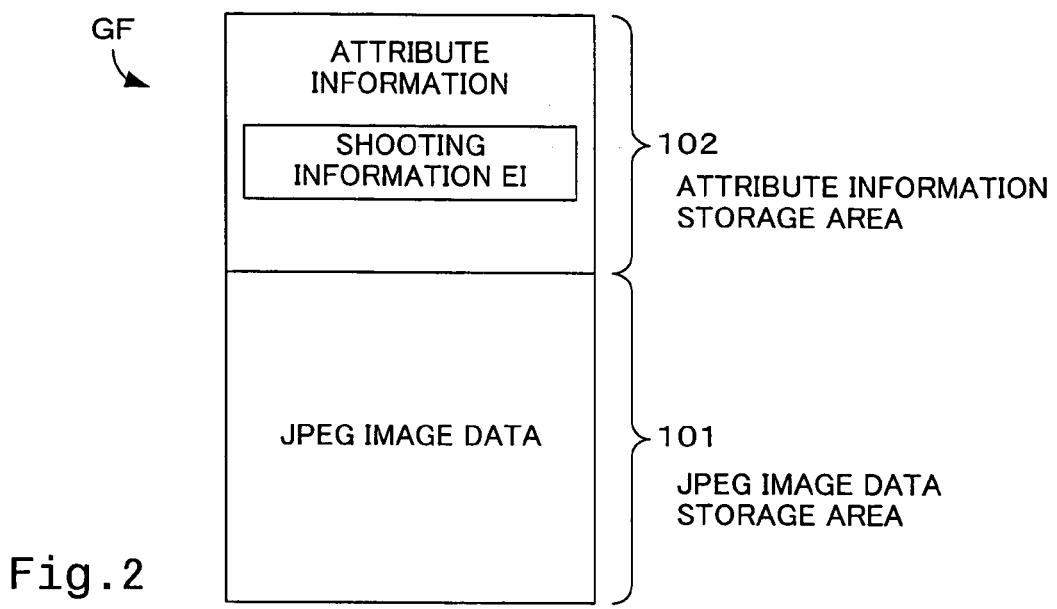
FIG. 2 schematically shows the internal structure of an image file GF stored in an Exif file format.
FIG. 3 shows parameters stored as shooting information EI.

The schematic internal structure of the image file in the Exif file format is described with reference to FIGS. 2 and 3. FIG. 2 schematically shows the internal structure of an image file GF stored in the Exif file format. FIG. 3 shows parameters stored as the shooting information EI. The terminologies 'file structure' 'data structure', and 'storage area' in this embodiment represent the image of a file or data stored in a storage device.

The image file GF in the Exif file format has a JPEG image data storage area 101 for storing image data in the JPEG format and an attribute information storage area 102 for storing various pieces of attribute information relating to the stored JPEG image data. The attribute information storage area 102 stores TIFF thumbnail image data of each JPEG image stored in the JPEG image data storage area 101 and the shooting information EI with regard to shooting conditions of each JPEG image, for example, ISO sensitivity (ISO speed), image compression ratio, ON or OFF of flash (strobe light), lens focal length, shutter speed, light source, exposure, gain control (sensitizing and desensitizing amount), image width, image height, 35 mm lens focal length, resolution in height of the focal plane, resolution in width of the focal plane, and resolution unit of the focal plane. The attribute information including the shooting information EI is automatically stored into the attribute information storage area 102, when the image data is written into the memory card MC. As is known to the skilled in the art, the image file in the Exif format uses tags for identifying the respective data. The personal computer 20 or the image processing device thus specifies a tag to obtain desired shooting information EI.

The attribute information storage area 102 also stores image processing control information GI that specifies image processing conditions to attain optimum image output results by taking into account color reproduction characteristics and image output characteristics of the color printer 30 or the output device. The image processing control information GI includes parameters relating to the image quality, for example, color space matrix entries to specify a color space used for image processing by the personal computer 20, gamma correction values of the specified color space, contrast, color balance adjustment, sharpness, and color correction.

The color printer 30 is capable of outputting color images and is, for example, an inkjet printer that ejects four color inks, cyan (C), magenta (M), yellow (Y), and black (K) onto a printing medium to create a dot pattern and thereby form an image or an electrophotographic printer that transfers and fixes color toners on a printing medium to form an image. Other color inks, light cyan (LC), light magenta (LM), and dark yellow (DY) may also be used, in addition to the above four color inks.

B. Image Processing Executed by Personal Computer 20

First Embodiment

Figure 4:
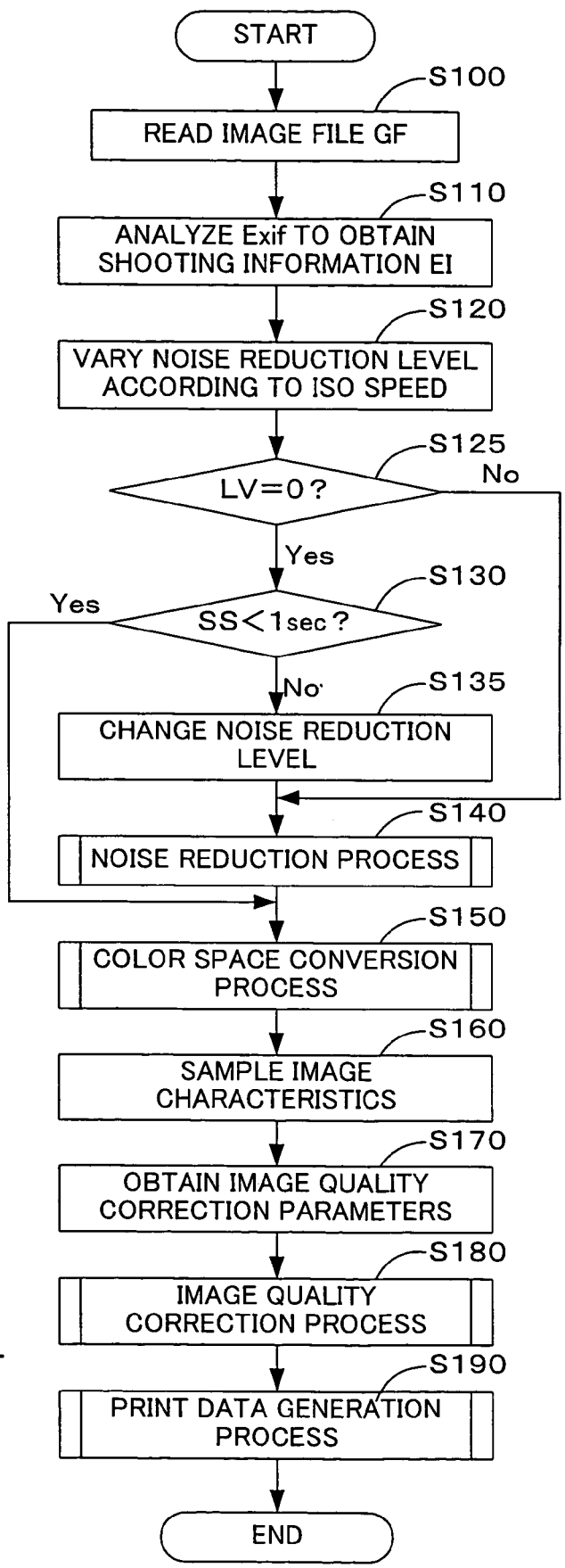
FIG. 4 is a flowchart showing a main image processing routine executed by a personal computer 20 in a first embodiment.
Figure 5:
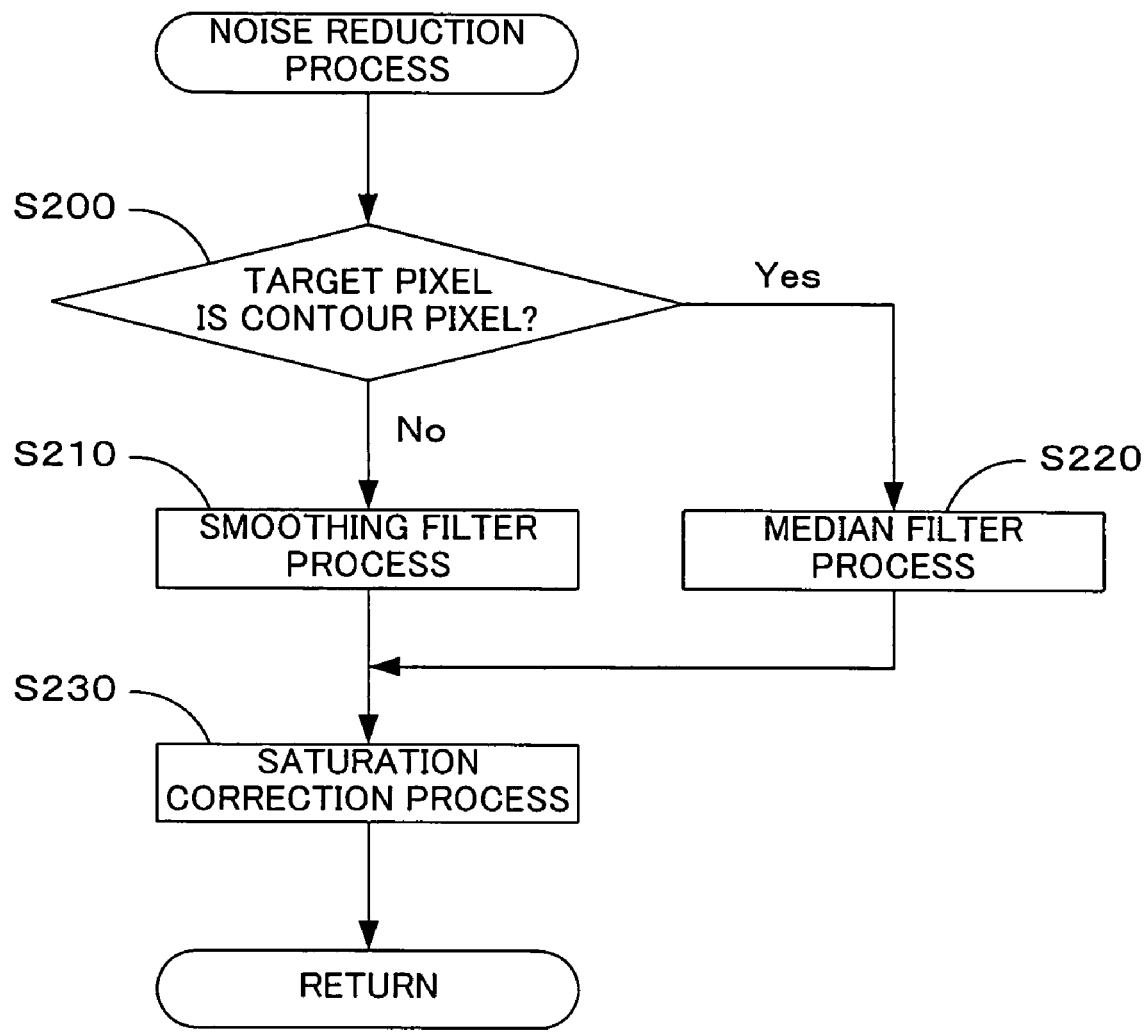
FIG. 5 is a flowchart showing a noise reduction routine executed by the personal computer 20.
Figure 6:
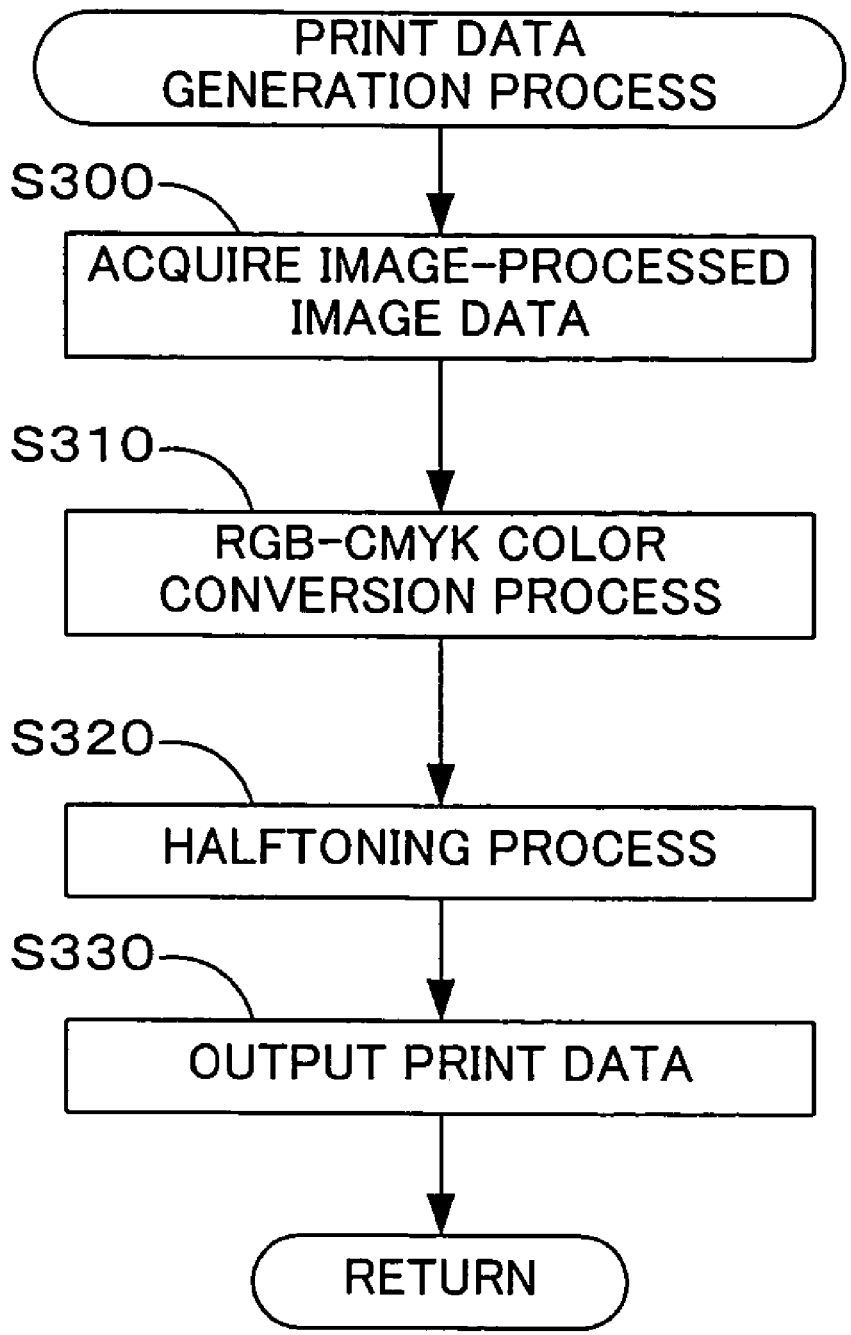
FIG. 6 is a flowchart showing a print data generation routine executed by the personal computer 20.

A series of image processing executed by the personal computer 20 in a first embodiment is discussed below with reference to FIGS. 4 through 6. FIG. 4 is a flowchart showing a main image processing routine executed by the personal computer 20 in the first embodiment. FIG. 5 is a flowchart showing a noise reduction routine executed by the personal computer 20. FIG. 6 is a flowchart showing a print data generation routine executed by the personal computer 20.

The CPU 200 of the personal computer 20 starts the image processing routine when the memory card MC is inserted into the slot 250 or when the connector cable CV linked with the DSC 12 on the other end is connected with the input output terminal 255. The CPU 200 first reads an image file GF from the memory card MC via the slot 250 or through the connector cable CV and temporarily registers the read-out image file GF into the RAM 210 (step S100). The image data GD stored here are YCbCr data. The CPU 200 then analyzes the Exif file format of the read-out image file GF and acquires the shooting information EI including the values of parameters, an ISO speed ISO and a shutter speed SS (step S110). The values of the respective parameters in the Exif file format are registered at predetermined positions. The CPU 200 accordingly indicates an address, at which the value of each required parameter is stored, with a pointer to obtain the value of the required parameter.

The CPU 200 subsequently sets a noise reduction level LV according to the acquired ISO speed (step S120). When the noise reduction level LV is set equal to 0 for ISO 100 and equal to 255 for ISO 800, the noise reduction level LV is expressed as:

$$LV=(255/700)*ISO-(255/7).$$

Namely the noise reduction level LV is varied with a variation in ISO speed.

The ISO speed (sensitivity) and the shutter speed SS are used as the criteria of varying the noise reduction level LV. An increase in ISO speed heightens the sensitivity of the CCD and enhances the potential for noise generation, while a decrease in shutter speed SS enhances the potential for noise generation. The ISO speed and the shutter speed SS are thus adequate parameters as the indication of the noise generation level.

The CPU 200 then determines whether the noise reduction level LV, which is varied (set) according to the ISO speed, is equal to 0 (step S125). When it is determined that LV is not equal to 0 (step S125: No), the CPU 200 carries out a noise reduction process (step S140). When it is determined that LV is equal to 0 (step S125: Yes), on the other hand, the CPU 200 subsequently determines whether the shutter speed SS is less than 1 sec (step S130).

When it is determined that the shutter speed SS is less than 1 sec (step S130: Yes), the CPU 200 skips the noise reduction process and proceeds to a color space conversion process (step S150). When it is determined that the shutter speed SS is not less than 1 sec (step S130: Yes), on the other hand, the CPU 200 changes the noise reduction level LV (step S140).

The CPU 200 changes the noise reduction level LV according to the following procedure. The change process first divides the noise reduction level LV into three ranges, 1 to 95, 96 to 126, and 127 to 254. When the current noise reduction level LV is in the range of 1 to 95, the noise reduction level LV is set equal to 96. When the current noise reduction level LV is in the range of 96 to 126, the noise reduction level LV is set equal to 127. When the current noise reduction level LV is in the range of 127 to 254, the noise reduction level LV is set equal to 255.

The CPU 200 may otherwise add a preset value, for example, 20, to change the noise reduction level LV. This method attains not a stepwise change but a linear change of the noise reduction level LV.

The CPU 200 specifies a filter size R used for the noise reduction process, based on the noise reduction level LV that is set according to the ISO speed:

$$R' = LV^3 - 5LV^2 + 10LV - 3$$

The CPU 200 extracts the integral part of the calculated value R' as the filter size R. For example, the filter size R=3 for LV=1, R=5 for LV=96, R=9 for LV=127, and R=21 for LV=255.

The details of the noise reduction process are described with reference to FIG. 5. As is known in the art, the color noise is generally reducible by softening color difference signals. The procedure of this embodiment accordingly uses the color difference components Cb and Cr of the image data GD expressed as YCbCr data to attain noise reduction for each pixel of the image data GD. The CPU 200 first determines whether a pixel of interest or a target pixel is a contour pixel, which is located on or in the vicinity of a contour of an image (step S200). A smoothing filter is typically used for noise reduction. A median filter is, however, preferably used for contour pixels, since application of the smoothing filter on the contour pixels undesirably lowers the image quality. This is the reason why the decision (step S200) is carried out first.

The concrete procedure compares an absolute difference between a color difference value Cra (Cba) of a target pixel and a color difference value Crb (Cbb) of each reference pixel, which is other than the target pixel in the area of an R×R filter having the specified filter size R, with a threshold value ThE. A pixel having an extremely greater color difference value or an extremely smaller color difference value than the color difference values of peripheral pixels is recognized as a noise. The CPU 200 calculates the absolute difference of each pixel included in the R×R filter by an equation of:

$$\Delta Crij = |Cra - Crb| \qquad \text{Equation (1)}$$

If even one absolute difference among the calculated values of ΔCrij is greater than the threshold value ThE, it is determined that a contour pixel is included in the currently processed area of the R×R filter. The Cb component is also subjected to this series of processing. The noise reduction is accordingly carried out with a filter corresponding to the result of the individual judgment with regard to each of the color difference components Cr and Cb.

An absolute difference between values of the luminance component Y is also applicable for the determination of whether the target pixel is a contour pixel. In this case, both of the color difference components Cr and Cb of each pixel included in the area of the R×R filter, which is determined to include at least one contour pixel, are the subject of the noise reduction with the median filter.

When it is determined that the target pixel is not a contour pixel (step S200: Yes), the CPU 200 carries out a filtering process with a smoothing filter (step S210). The concrete procedure calculates an average color difference value of the reference pixels included in the area of the R×R filter with regard to the color difference component Cr according to Equation (2) given below and sets the calculated average color difference value to a new color difference value Cr' of the target pixel:

$$Cr' = \frac{\sum_{j=0}^{N}\sum_{i=0}^{N} Cr}{N*N} \qquad \text{Equation (2)}$$

In a similar manner, the CPU 200 calculates a new color difference value Cb' with regard to the color difference component Cb according to Equation (3) given below:

$$Cb' = \frac{\sum_{j=0}^{N}\sum_{i=0}^{N} Cb}{N*N} \qquad \text{Equation (3)}$$

When it is determined that the target pixel is a contour pixel (step S200: No), on the other hand, the CPU 200 carries out a filtering process with a median filter (step S220). The concrete procedure sorts the color difference values of the target pixel and the reference pixels included in the area of the R×R filter and sets respective medians to the new color difference values Cr' and Cb' of the target pixel.

The CPU 200 makes the resulting color difference value Cr' (Cb'), which is obtained by the filtering process, subjected to a saturation correction process (step S230), before returning to the image processing routine. A dark image part generally has a high noise level, and some model of the DSC 12 is characterized by a high level of color noise generation at an intrinsic luminance value Y'. The saturation correction process corrects the color difference values according to these circumstances, so as to reduce the noise level. For example, at an intrinsic luminance value Y'=64, corrected saturation values Cr" and Cb" are calculated from the resulting color difference values Cr' and Cb', which are obtained by the filtering process, according to Equations (4) and (5) given below:

$$Cr'' = \frac{3}{4}Cr' + \frac{|Y - Y'|}{32} * \frac{1}{4}Cr' \qquad \text{Equation (4)}$$

$$Cb'' = \frac{3}{4}Cb' + \frac{|Y - Y'|}{32} * \frac{1}{4}Cb' \qquad \text{Equation (5)}$$

In the luminance value range 32<Y<96 with a center on a luminance value 64 having a high level of color noise generation, the above equations effectively lower the color difference value to ¾ at the minimum according to the luminance value, thereby reducing the color noise level.

Referring back to the image processing routine of FIG. 4, the CPU 200 carries out the color conversion process that converts the resulting YCbCr data going through the noise reduction into RGB data (step S150). The color conversion process executes matrix operations with a matrix S defined in the JPEG File Interchange Format (JFIF). The color conversion may convert the color space of the image data into an extended RGB color space having a wider color reproduction area than that of the RGB color space currently used for expressing the image data. For example, a color matching technique via an XYZ color space known as an absolute color space may be applied for such color conversion.

The CPU 200 samples the image data GD converted into the RGB data to acquire characteristic values (image statistics) with regard to the respective parameters relating to the image quality of the image data GD (step S160). The CPU 200 subsequently analyzes the image processing control information GI to obtain image quality correction parameters (step S170).

The CPU 200 then makes the image data GD subjected to an image quality correction process (step S180). The CPU 200 creates an input-output curve from the acquired image statistics of the image data GD with regard to each parameter and compensates the created input-output curve to reduce or eliminate differences between a reference value as a target correction value set for each parameter and the image statistics of each parameter. The value of the image quality correction parameter is used to vary the degree (level) of reduction of the differences between the reference value and the image statistics of each parameter or to change the reference value. The value of the image quality correction parameter is also used to directly vary the image statistics.

The CPU 200 uses the corrected input-output curve to correct the value of the image data GD with regard to each pixel, so as to compensate for the image quality of the image data GD. The CPU 200 subsequently carries out a print data generation process for the image-processed image data GD (step S190). The CPU 200 then terminates the image processing routine.

The print data generation process is described with reference to FIG. 6. This series of processing is generally attained by the functions of a printer driver. The print data generation module may be separate from the image processing module or may be integrated with the image processing module. The CPU 200 first acquires the image-processed image data GD (step S300), and refers to a lookup table (LUT) for RGB-CMYK conversion stored in the HDD 220 to convert the RGB image data into the CMYK image data (step S310). This process converts image data expressed by tone values of R, G, and B into image data expressed by tone values of, for example, six colors C, M, Y, K, LC, and LM used in the printer 30.

The CPU 200 subsequently carries out a halftoning process (tone number conversion process) for the converted CMYK image data (step S320), and outputs the resulting processed image data as raster data to a print controller (not shown) of the printer 30 for printout (step S330). The CPU 200 then terminates this print data generation process. The error diffusion technique or the systematic dither technique is generally applied for the halftoning process.

As described above, the personal computer 20 functioning as the image processing device of the embodiment carries out the image quality adjustment of the image data GD, based on the shooting information EI included in the image file GF. Especially the recorded values (settings) of the ISO sensitivity and the shutter speed out of the shooting information EI are effectively used to ensure adequate noise reduction of the image data GD based on the shooting conditions. The target of the image processing is Exif image files, where Exif is the standard record format of the image data GD adopted for the DSC 12. The image processing device having the image processing functions to attain the adequate noise reduction as discussed in the above embodiment is advantageously applicable for various purposes.

C. Image Processing Executed by Personal Computer 20

Second Embodiment

The procedure of the first embodiment determines the noise reduction level according to the ISO speed. When the noise reduction level is described in the image processing control information GI stored in an Exif file, the described noise reduction level may be set to the original noise reduction level LV.

Figure 7:
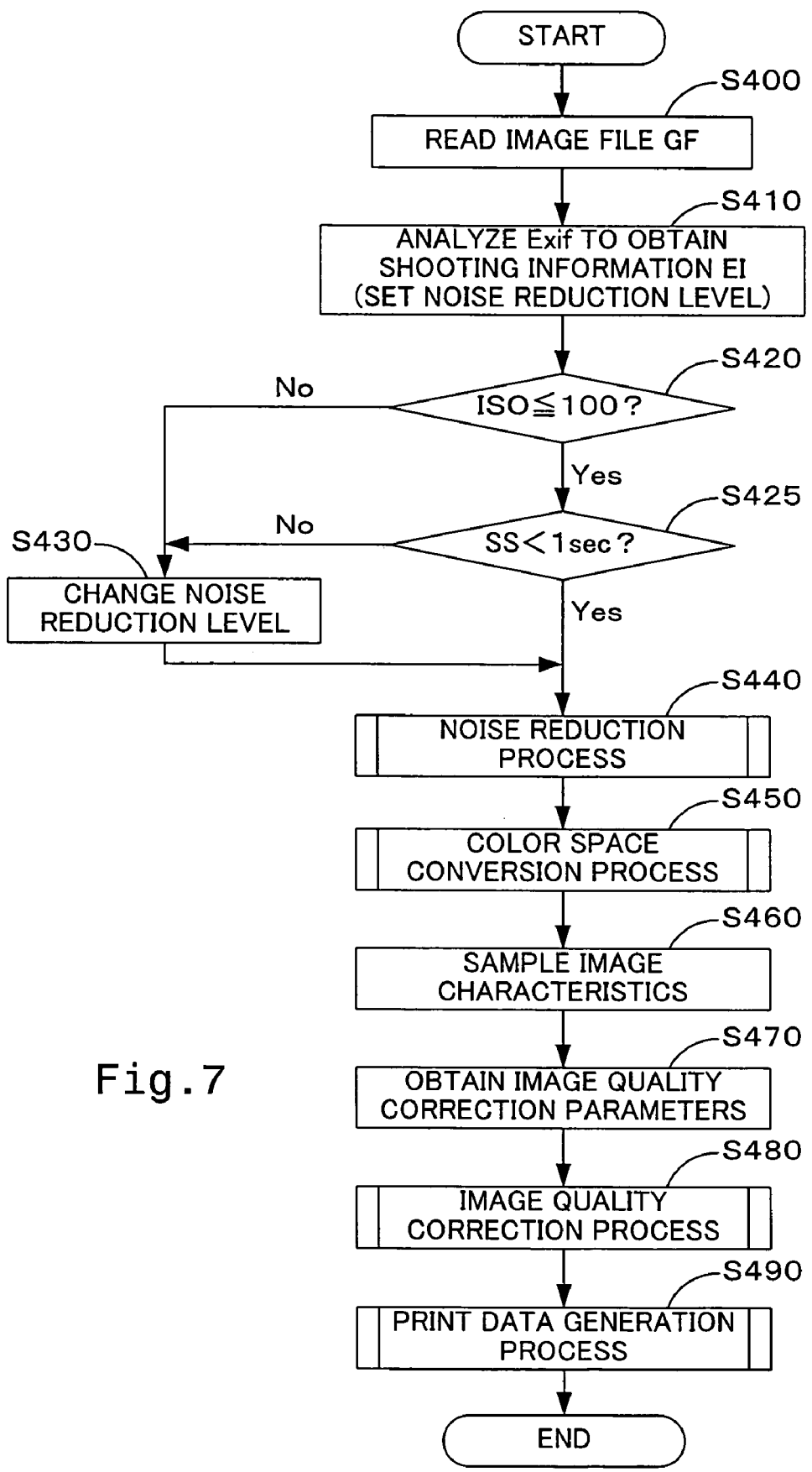
FIG. 7 is a flowchart showing a main image processing routine executed by the personal computer 20 in another embodiment.

In this case, the noise reduction level may be changed as described with reference to FIG. 7. FIG. 7 is a flowchart showing a main image processing routine executed by the personal computer 20 in another embodiment. FIG. 8 is a map representing a relation between the noise reduction level LV and the filter size R. The construction of an image processing system used for the second embodiment is identical with the construction of the image processing system 10 of the first embodiment. The respective constituents of the image processing system are thus expressed by like numerals and symbols and are not described specifically. The processing of step S400 and the processing of step S450 and subsequent steps in FIG. 7 are identical with those of the corresponding steps in the first embodiment discussed with reference to FIG. 4 and are thus omitted from the explanation below.

The CPU 200 analyzes the Exif file format to obtain the shooting information EI and analyzes the image processing control information GI to acquire the setting of the noise reduction level LV (step S410). The CPU 200 determines whether the ISO speed is not greater than 100 (step S420). When it is determined that ISO $\leq$100 (step S420: Yes), the CPU 200 subsequently determines whether the shutter speed SS is less than 1 sec (step S425). When it is determined that ISO >100 (step S420: No), on the other hand, the CPU 200 changes the noise reduction level LV (step S30) and carries out a noise reduction process (step S140). When it is determined that the shutter speed SS is not less than 1 sec (step S425: No), the CPU 200 also changes the noise reduction level LV (step S430) and carries out the noise reduction process (step S440).

In this embodiment, the CPU 200 changes the noise reduction level LV when either of the conditions, the ISO speed ISO >100 and the shutter speed SS $\geq$1 sec, is satisfied. The change process first divides the noise reduction level LV into three ranges, 1 to 95, 96 to 126, and 127 to 254. When the original noise reduction level LV is in the range of 1 to 95, the noise reduction level LV is set equal to 96. When the original noise reduction level LV is in the range of 96 to 126, the noise reduction level LV is set equal to 127. When the original noise reduction level LV is in the range of 127 to 254, the noise reduction level LV is set equal to 255.

When it is determined that the shutter speed SS is less than 1 sec (step S125: Yes), on the other hand, the CPU 200 carries out the noise reduction process with the noise reduction level LV specified by the image processing control information GI (step S440).

The noise reduction process (step S440) specifies the filter size R used for the filtering process, based on the relation between the noise reduction level LV and the filter size R shown in FIG. 8.

As described above, the image processing of the second embodiment carries out the noise reduction of the image data GD, based on the image processing control information GI and the shooting information EI included in the image file GF. The adequate noise reduction level for each image data is described in the image processing control information GI. This arrangement ensures execution of the desired noise reduction. The target of the image processing is Exif image files, where Exif is the standard record format of the image data GD adopted for the DSC 12. The image processing device having the image processing functions to attain the adequate noise reduction as discussed in the above embodiment is advantageously applicable for various purposes.

D. Image Processing Executed by Personal Computer 20

Third Embodiment

Figure 9:
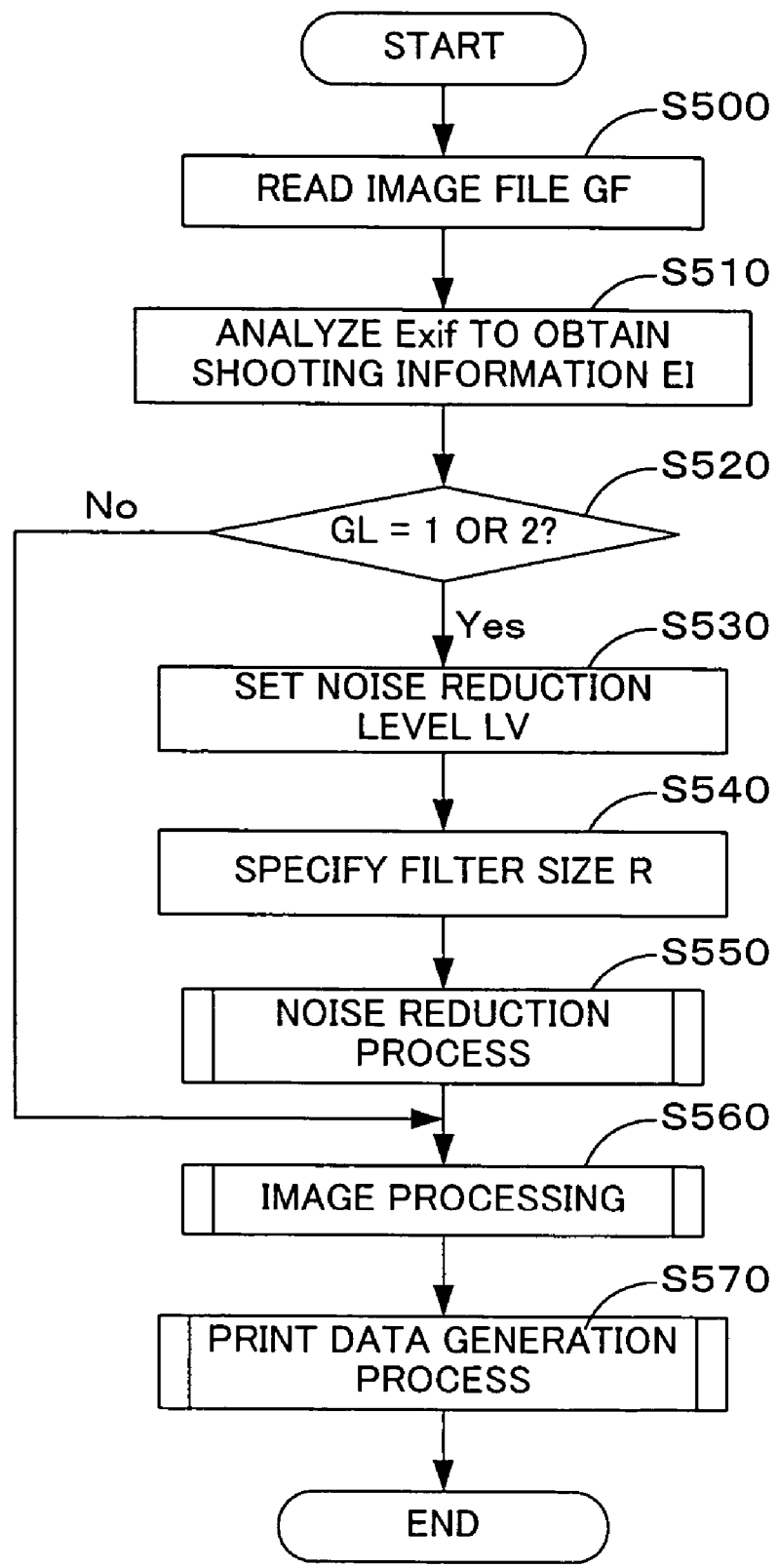
FIG. 9 is a flowchart showing a main image processing routine executed by the personal computer 20 in a third embodiment.

A series of image processing executed by the personal computer 20 in a third embodiment is described with reference to FIG. 9. FIG. 9 is a flowchart showing a main image processing routine executed by the personal computer 20 in the third embodiment. The construction of an image processing system used for the third embodiment is identical with the construction of the image processing system 10 of the first embodiment. The respective constituents of the image processing system are thus expressed by like numerals and symbols and are not described specifically.

The image processing of the third embodiment determines the noise reduction level according to the level of gain control (gain control amount), in place of the ISO speed. The gain control amount is an application amount (level) of a gain control parameter on the sensitivity of shooting and represents an amplification amount or an attenuation amount (a sensitizing amount or a desensitizing amount) of an image signal generated at the time of shooting. Sensitization of the shooting sensitivity (that is, amplification of the image signal) leads to amplification of the noise component included in the image signal and thereby enhances the occurrence of noise in a resulting output image. The procedure of the third embodiment thus carries out a noise reduction process based on the gain control amount, so as to reduce the noise appearing in the output image with the amplification of the shooting sensitivity.

The gain control amount is specified by a gain control parameter GL described in the shooting information EI of the Exif file. The gain control parameter GL takes a value '0' for no sensitization, a value '1' for a lower degree of sensitization, a value '2' for a higher degree of sensitization, a value '3' for a lower degree of desensitization, and a value '4' for a higher degree of desensitization. The gain control parameter GL may be classified into a greater number of levels.

The CPU 200 of the personal computer 20 starts the image processing routine when the memory card MC is inserted into the slot 250 or when the connector cable CV linked with the DSC 12 on the other end is connected with the input output terminal 255. The CPU 200 first reads an image file GF from the memory card MC via the slot 250 or through the connector cable CV and temporarily registers the read-out image file GF into the RAM 210 (step S500). The image data GD stored here are YCbCr data. The CPU 200 then analyzes the Exif file format of the read-out image file GF and acquires the value of the gain control parameter GL (step S510). The value of the gain control parameter GL in the Exif file format is registered at a predetermined position. The CPU 200 accordingly indicates an address, at which the value of the required parameter is stored, with a pointer to obtain the value of the required parameter.

The CPU 200 determines whether the shooting sensitivity is sensitized according to the acquired value of the gain control parameter GL (step S520). More specifically, the CPU 200 determines that the shooting sensitivity is sensitized, when the acquired value of the gain control parameter GL is equal to 1 or 2 (step S520: Yes). The CPU 200 determines that the shooting sensitivity is not sensitized, on the other hand, when the acquired value of the gain control parameter GL is equal to 0, 3 or 4 (step S520: No).

When it is determined that the shooting sensitivity is not sensitized (step S520: No), the CPU 200 judges that there is little possibility of the occurrence of noise in a resulting output image and thereby skips the noise reduction process. The CPU 200 accordingly carries out image processing of the image data (step S560) and a print data generation process (step S570), before terminating this image processing routine.

When it is determined that the shooting sensitivity is sensitized (step S520: Yes), on the other hand, the CPU 200 sets the noise reduction level LV according to the value of the gain control parameter GL (step S530). For example, the noise reduction level LV is set equal to 127 for the gain control parameter GL=1 and is set equal to 255 for the gain control parameter GL=2. The CPU 200 specifies the filter size R used for the noise reduction according to the setting of the noise reduction level LV (step S540).

$$R'=LV^3-5LV^2+10LV-3$$

The CPU 200 extracts the integral part of the calculated value R' as the filter size R. For example, the filter size R=3 for LV=1, R=5 for LV=96, R=9 for LV=127, and R=21 for LV=255.

The CPU 200 carries out the noise reduction of the image data with the specified filter size R as discussed in the first embodiment (step S550), the image processing of the resulting image data going through the noise reduction process (step S560), and the print data generation process (step S570), before terminating this image processing routine. The image processing at step S560 includes, for example, the color space conversion, sampling of the image quality characteristics, and the image quality correction with the image quality correction parameters as discussed in the first embodiment. The print data generation process at step S570 is, for example, identical with the print data generation process discussed in the first embodiment.

The image processing of the third embodiment ensures execution of the adequate noise reduction according to the shooting sensitivity. When the shooting sensitivity is sensitized to raise the possibility of noise generation in an output image, the noise reduction process is carried out to reduce the noise appearing in the output image. When the shooting sensitivity is unchanged or desensitized, on the other hand, the noise reduction process is not carried out to prevent a deterioration of the picture quality of the output image.

The image processing of the third embodiment refers to the value of the gain control parameter GL described in the shooting information EI relating to the image data, and determines requirement or non-requirement of the noise reduction process. This arrangement executes the noise reduction without the user's decision regarding requirement or non-requirement of the noise reduction process.

The target of the image processing is Exif image files, where Exif is the standard record format of the image data GD adopted for the DSC 12. The image processing device having the image processing functions to attain the adequate noise reduction as discussed in the above embodiment is advantageously applicable for various purposes.

Figure 10:
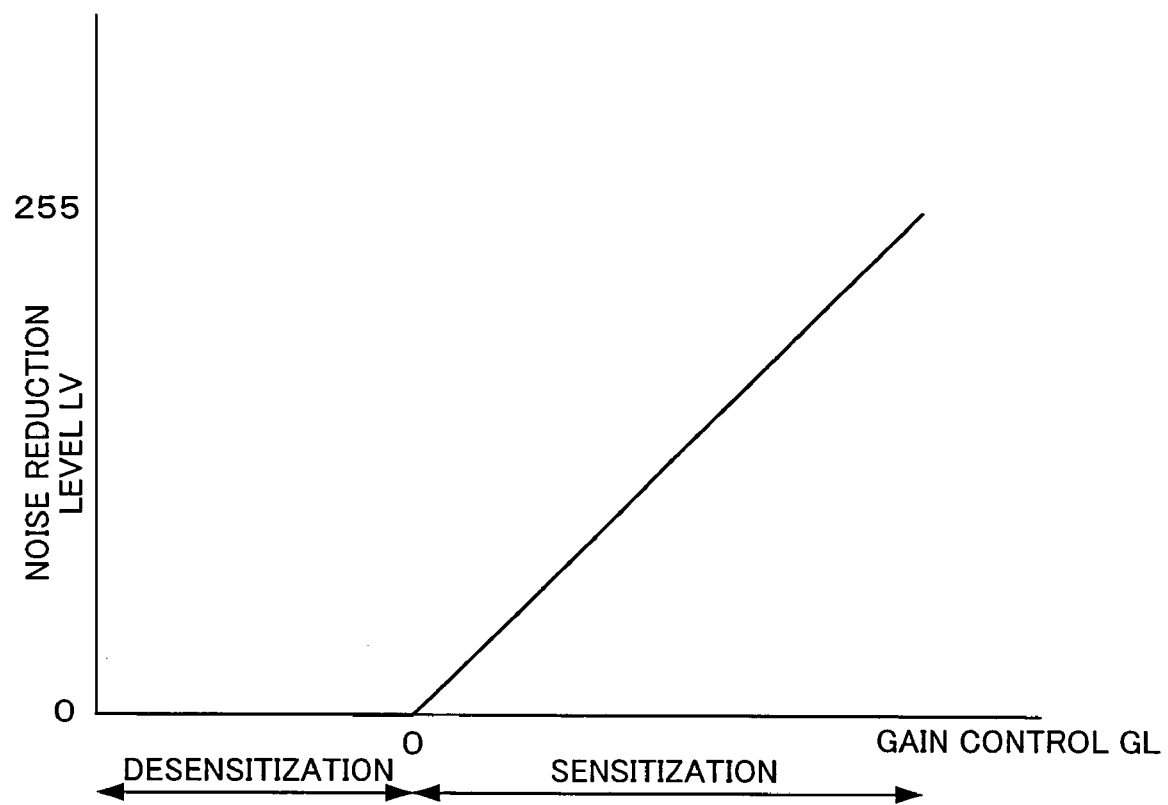
FIG. 10 is a map showing a linear reflection of gain control parameter GL on the noise reduction level LV.

The third embodiment regards the noise reduction process with reflection of the value of the gain control parameter GL, which is related to the sensitization and takes the value in the range of 0 to 4, in a stepwise manner. One modified procedure may classify the gain control parameter GL into a greater number of levels and attain linear reflection of the value of the gain control parameter GL related to the sensitization as shown in FIG. 10. FIG. 10 is a map showing a linear reflection of the gain control parameter GL on the noise reduction level LV. In this illustrated example, the noise reduction level increases with sensitization of the shooting sensitivity.

E. Image Processing Executed by Personal Computer 20

Fourth Embodiment

Figure 11:
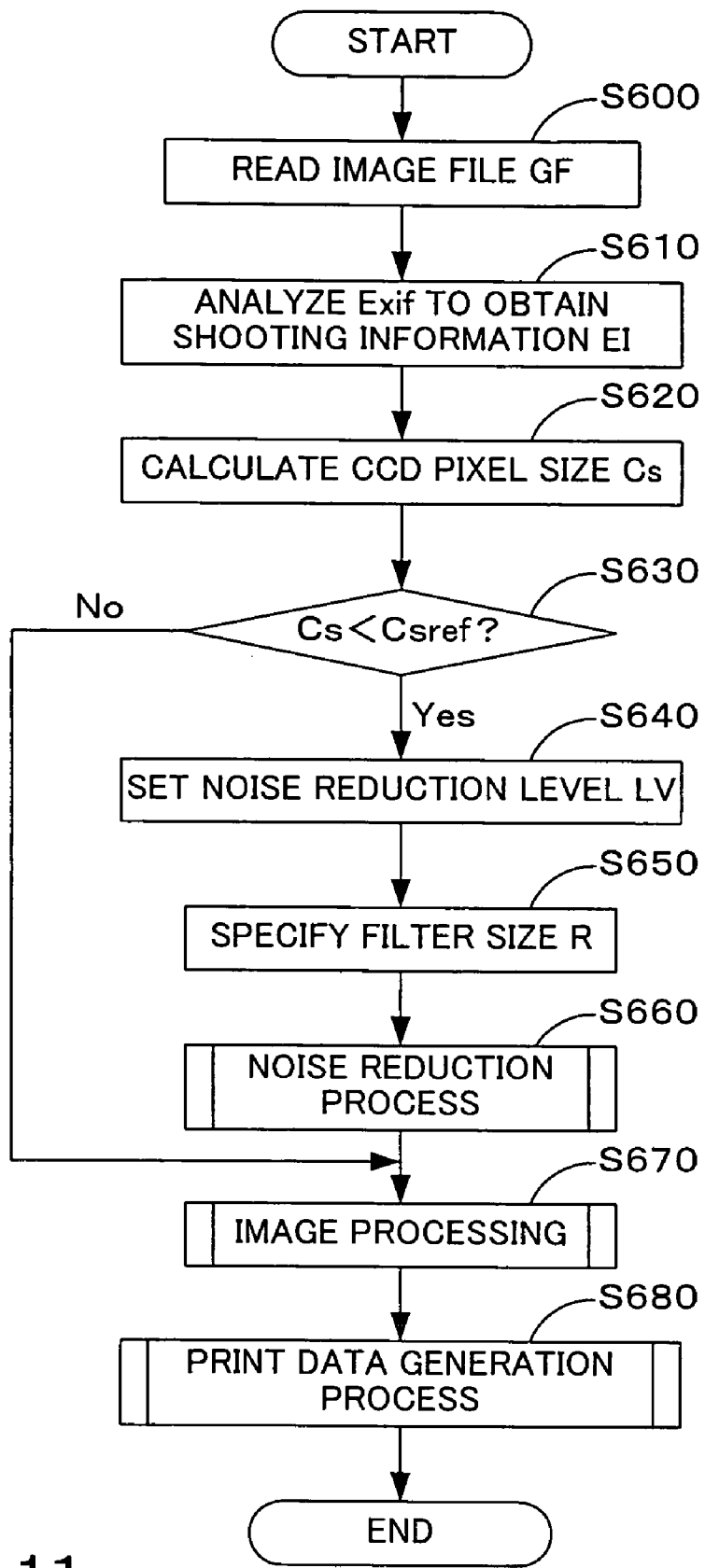
FIG. 11 is a flowchart showing a main image processing routine executed by the personal computer 20 in a fourth embodiment.

A series of image processing executed by the personal computer 20 in a fourth embodiment is described with reference to FIG. 11. FIG. 11 is a flowchart showing a main image processing routine executed by the personal computer 20 in the fourth embodiment. The construction of an image processing system used for the fourth embodiment is identical with the construction of the image processing system 10 of the first embodiment. The respective constituents of the image processing system are thus expressed by like numerals and symbols and are not described specifically.

The image processing of the fourth embodiment determines the noise reduction level according to the CCD pixel size (that is, the size of a unit pixel of the CCD), in place of the ISO speed. An increase in CCD pixel size expands a dynamic range and thereby lowers the susceptibility to the noise, whereas a decrease in CCD pixel size narrows the dynamic range and thereby heightens the susceptibility to the noise. The DSC for the general use of the consuming public does not change the size of the CCD (the size of the optical system) but decreases the CCD pixel size to raise the number of pixels. Reduction of the noise generation in an output image is thus of an important issue. The procedure of the fourth embodiment carries out the noise reduction process based on the CCD pixel size, thereby reducing the noise appearing in the output image due to the decrease in CCD pixel size.

A CCD pixel size Cs is not directly described in the shooting information EI of the Exif file and is thus calculated from the shooting information EI. The procedure of this embodiment applies either of two computation techniques to specify the CCD pixel size Cs.

The CPU 200 of the personal computer 20 starts the image processing routine when the memory card MC is inserted into the slot 250 or when the connector cable CV linked with the DSC 12 on the other end is connected with the input output terminal 255. The CPU 200 first reads an image file GF from the memory card MC via the slot 250 or through the connector cable CV and temporarily registers the read-out image file GF into the RAM 210 (step S600). The image data GD stored here are YCbCr data. The CPU 200 then analyzes the Exif file format of the read-out image file GF to acquire the shooting information EI (step S610), and calculates the CCD pixel size Cs (step S620).

(1) First Computation Technique

A first computation technique utilizes the resolution unit of the focal plane, the resolution in height of the focal plane, and the resolution in width of the focal plane among the various pieces of information described as the shooting information EI to calculate the unit pixel size. It is assumable that the resolution in the focal plane of a main image recorded as a file is equal to the effective resolution of a light receiving plane of a shooting element used for generating the main image. The unit pixel size is accordingly calculated from the effective resolution of the CCD in the focal plane.

The resolution in height of the focal plane and the resolution in width of the focal plane are described by the resolution unit in the shooting information EI. The size (the width and height) of the unit pixel is calculated by dividing the resolution unit of the focal plane by the respective resolutions of the focal plane according to equations given below. In the shooting information EI, the value allocated to the resolution unit of the focal plane is equal to 2 for inch and is equal to 3 for centimeter.

$Cs$(Height)=Resolution Unit of Focal Plane/Resolution in Height of Focal Plane $Cs$(Width)=Resolution Unit of Focal Plane/Resolution in Width of Focal Plane (2) Second Computation Technique A second computation technique utilizes the 35 mm focal length, the focal length, the image width, and the image height among the various pieces of information described as the shooting information EI to calculate the unit pixel size. This technique sets a correlation of the size of 35 mm film to the size of a light receiving plane of the CCD as a model and utilizes the ratio of the focal length to the 35 mm focal length to calculate the CCD pixel size Cs in the diagonal direction:

$Cs$(Diagonal)=$CCD$ Diagonal Length/Number of Pixels in Diagonal of $CCD$ $$CCD \text{ Diagonal Length} = \frac{35 \text{ mm Film Diagonal Length} * \text{Focal Length}}{35 \text{ mm Focal Length}}$$

$$\text{Number of Pixels in Diagonal of } CCD = \sqrt{(\text{Image Width})^2 + (\text{Image Height})^2}$$

The value of each piece of the shooting information EI in the Exif file format is registered at a predetermined position. The CPU 200 accordingly indicates an address, at which the value of each required parameter is stored, with a pointer to obtain the value of the required parameter.

The CPU 200 determines whether the CCD pixel size Cs calculated by either of the above computation techniques requires the noise reduction process (step S630). When the calculated CCD pixel size Cs is smaller than a reference pixel size Csref, the CPU 200 determines requirement of the noise reduction process (step S630: Yes). When the calculated CCD pixel size Cs is not smaller than the reference pixel size Csref, on the other hand, the CPU 200 determines non-requirement of the noise reduction process (step S630: No). The concrete value of the reference pixel size Csref is, for example, 4 to 6 μm. The DSC for the general use of the consuming public has the CCD pixel size of about 3 μm, while the DSC of the single lens reflex type for professional use has the CCD pixel size of about 7 μm. It is empirically known that the DSC for professional use has the lower noise level.

When it is determined that there is little possibility of the occurrence of noise in an output image (step S630: No), the CPU 200 skips the noise reduction process. The CPU 200 accordingly carries out image processing of the image data (step S670) and a print data generation process (step S680), before terminating this image processing routine.

When the CCD pixel size Cs is smaller than the reference pixel size Csref and requirement of the noise reduction process is determined (step S630: Yes), the CPU 200 sets the noise reduction level LV (step S640). When only one value is applied for the reference pixel size Csref as in this embodiment, the CPU 200 sets, for example, the noise reduction level LV=127 and specifies the filter size R used for the noise reduction according to the setting of the noise reduction level LV (step S650).

$$R' = LV3 - 5LV2 + 10LV - 3$$

The CPU 200 extracts the integral part of the calculated value R' as the filter size R. For example, the filter size R=3 for LV=1, R=5 for LV=96, R=9 for LV=127, and R=21 for LV=255.

The CPU 200 carries out the noise reduction of the image data with the specified filter size R as discussed in the first embodiment (step S660), the image processing of the resulting image data going through the noise reduction process (step S670), and the print data generation process (step S680), before terminating this image processing routine. The image processing at step S670 includes, for example, the color space conversion, sampling of the image quality characteristics, and the image quality correction with the image quality correction parameters as discussed in the first embodiment. The print data generation process at step S680 is, for example, identical with the print data generation process discussed in the first embodiment.

The image processing of the fourth embodiment ensures execution of the adequate noise reduction according to the CCD pixel size applied for the DSC. When the CCD pixel size (the size of the unit pixel) is small to raise the possibility of noise generation in an output image, the noise reduction process is carried out to reduce the noise appearing in the output image. When the CCD pixel size is large, on the other hand, the noise reduction process is not carried out to prevent a deterioration of the picture quality of the output image.

The image processing of the fourth embodiment refers to the useful values for calculation of the CCD pixel size described in the shooting information EI relating to the image data, and determines requirement or non-requirement of the noise reduction process. This arrangement executes the noise reduction without the user's decision regarding requirement or non-requirement of the noise reduction process.

The target of the image processing is Exif image files, where Exif is the standard record format of the image data GD adopted for the DSC 12. The image processing device having the image processing functions to attain the adequate noise reduction as discussed in the above embodiment is advantageously applicable for various purposes.

The procedure of the fourth embodiment uses one value of the reference pixel size Csref to determine execution or non-execution of the noise reduction process. One modified procedure may use multiple values of the reference pixel size Csref and carry out the noise reduction process with multiple settings of the noise reduction level LV. This modified procedure ensures execution of the more adequate noise reduction according to the CCD pixel size.

In the respective embodiments discussed above, the personal computer 20 takes charge of the whole series of image processing. All or part of the image processing may alternatively be executed by the printer 30. This is attained by storage of an application program for executing the image processing functions described above with reference to FIG. 4 or the corresponding drawing in a memory device (for example, a hard disk or a ROM) of the printer 30. The image file GF generated by the digital still camera 12 is transmitted to the printer 30 via the cable CV or the memory card MC. When the printer 30 detects insertion of the memory card MC or connection of the cable CV, the application program is automatically activated to read the image file GF, analyze the shooting information EI, and carry out conversion and adjustment of the image data GD.

The embodiments described above are on the assumption that the image data GD generated by the DSC 12 includes the shooting information EI. One modified procedure may determine whether the image data GD includes the shooting information EI, acquire the shooting information EI, and execute the image processing with the acquired shooting information EI. When the image data GD does not include the shooting information EI, the procedure may carry out the image processing excluding the noise reduction process.

F. Other Embodiments (1) In the embodiments described above, the filtering process with the smoothing filter uses simple average pixel values to smooth the image. A two-dimensional Gaussian function given below may alternatively be applied to smooth the image:

$$G(x, y) = \frac{1}{2\pi\sigma^2} * \exp\left(-\frac{x^2 + y^2}{2\sigma^2}\right)$$

$$F(x,y) = G(x,y) * f(x,y)$$

This method applies the two-dimensional Gaussian function $G(x,y)$ having an average 0 and a variance $\sigma 2$ to the color difference components Cb and Cr of a target image $f(x,y)$ and thereby obtains a smoothed image $F(x,y)$ with only the color difference components Cb and Cr smoothed. In the case of a two-dimensional Gaussian distribution applied in all two-dimensional directions, $x=y=R$, which is specified as the filter size. This technique correlates the noise reduction level LV with the standard deviation $\sigma$ by a predetermined proportionality function to attain the noise reduction with reflection of the changed noise reduction level.

(2) In the above embodiments, the noise reduction process utilizes the shutter speed, the ISO sensitivity, and the gain control level among the various pieces of the shooting information EI. The image processing device of the present invention may utilize other pieces of the shooting information EI and carry out the image processing with reflection of the shooting conditions.

(2-1) One modified procedure takes advantage of the parameters relating to the use or non-use of strobe light and the focal length among the various pieces of the shooting information EI and executes background processing of a subject of shooting in the course of image processing. A low level of stroboscopic light emission may cause only a figure (subject) to be taken brightly, while the background is pitch dark. Under the stroboscopic condition, the correction is made to specify the distance to the subject from the focal length and heighten the lightness of the image data in the background area. This gives an image having the background of natural darkness.

(2-2) The parameter of the image compression ratio among the various pieces of the shooting information EI may be utilized for noise reduction in the course of image processing. The image data generated by the DSC are generally compressed in the JPEG format and stored in the memory card MC or the like. The image compression ratio is settable by the DSC 12 and is varied according to the application of the image. The image compression ratio is closely related to the image quality. As is known in the art, the higher image compression ratio generally makes the block noise prominent and lowers the image quality. The noise reduction process, which is executed for the purpose of reducing such noise, may lower the image quality, while reducing the noise level. The procedure refers to the parameter of the image compression ratio among the various pieces of the shooting information EI and sets a high noise reduction level for the high image compression ratio and a low noise reduction level for the low image compression ratio. This arrangement simultaneously attains the two requirements, the effective noise reduction and the high image quality.

(3) The above embodiments use the color printer 30 as the output device. A display device like a CRT, an LCD, or a projector may be used as the output device. In the latter cases, the display device functioning as the output device executes an image processing program (display driver) to attain the image processing discussed above with reference to FIG. 4 or the corresponding drawing. When the CRT or another display device functions as a display unit of a computer, the computer executes the image processing program. The resulting image data eventually output are not expressed in the CMYK color space but are expressed in the RGB color space.

The image data obtained as the result of the image quality adjustment with the shooting information EI are displayed on the display device like the CRT, while the image data as the result of the image quality adjustment with the shooting information EI are output from the color printer 30 in the above embodiments. This arrangement enables a resulting image with reflection of the shooting conditions to be displayed on the display device.

(4) In the embodiments discussed above, the image file GF is generated by the digital still camera 20. The image file GF may be generated by another input device (image file generation device), for example, a digital video camera (DVC) or a scanner. The resulting image file thus generated is a still image file including still image data and the shooting information EI or a video image file including video image data, for example, in the MPEG format, and the shooting information EI. In the case of the video image file, all or part of frames of the video image is subjected to image processing based on the shooting information EI.

The image processing device of the invention is described with reference to some embodiments. These embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The procedure of the above embodiment carries out the contour judgment and applies different filtering processes to contour pixels and other pixels. One possible modification may not carry out the contour judgment and apply the identical smoothing process to all pixels. Such modification attains the high-speed filtering process.

In the embodiments discussed above, the target of the noise reduction is JPEG data. One possible modification of the noise reduction process may convert the JPEG data (YCbCr data) into RGB data, adjust the image quality with regard to the RGB data, and re-convert the processed RGB data into YCbCr data.

The parameters discussed above are only illustrative and do not restrict the invention in any sense.

In the above embodiments, the image file GF is generated in the Exif format. The invention is, however, not restricted to image files in this format. The technique of the invention is applicable to any image file that includes at least the shooting information EI set in a shooting device. This is because such an image file enables the original saturation of the image data to be reproduced by an output device.

The terminology 'image file GF having image data and the shooting information EI' includes one modified structure that generates correlation data for correlating image data with the shooting information EI, stores the image data and the shooting information EI in separate files, and refers to the correlation data in the course of image processing to correlate the image data with the shooting information EI. In this modified structure, the image data and the shooting information EI are stored in separate files. At the time of image processing that utilizes the shooting information EI, however, the image data are integrated with the shooting information EI. This structure is thus practically the same as the structure of storing the image data and the shooting information EI in an identical file. Namely the structure of correlating the image data with the shooting information EI at least at the time of image processing is included in the image file GF of the embodiments. The image file GF also includes a video image file stored in an optical disc medium like a CD-ROM, a CD-R, a DVD-ROM, or a DVD-RAM.

What is claimed is:

1. An image processing device for carrying out noise reduction processing comprising:
   a microprocessor coupled to a memory,
   wherein the microprocessor is programmed to carry out noise reduction processing by:
   acquiring an image file including an ISO speed, shutter speed information and image data from a digital still camera, wherein the ISO speed and shutter speed information are associated with the image data by the digital still camera; and
   executing noise reduction processing on the image data, the executing of the noise reduction processing determining a noise reduction level based on the ISO speed and changing the determined noise reduction level based on the shutter speed information.

2. An image processing device in accordance with claim 1, wherein the microprocessor is further programmed to carry out the noise reduction processing by analyzing a shooting condition relating to lightness in shooting and setting an initial value of the noise reduction level.

3. A computer program product comprising:
   a non-transitory computer-readable storage medium; and
   a computer program stored on the non-transitory computer-readable storage medium, the computer program executing noise reduction processing of image data and including program code for acquiring an image file including the image data, an ISO speed and shutter speed information from a digital still camera, wherein the ISO speed and shutter speed information are associated with the image data by the digital still camera, and program code for executing the noise reduction processing on the image data by determining a noise reduction level based on the ISO speed and changing the determined noise reduction level based on the shutter speed information.

4. A computer program product in accordance with claim 3, further comprising program code for executing image processing, wherein the program code for executing image processing analyzes a shooting condition relating to lightness in shooting, sets an initial value of a noise reduction level, and changes the noise reduction level according to the shutter speed information.

5. A computer program product comprising:
- a non-transitory computer-readable storage medium; and
- a computer program stored on the non-transitory computer-readable storage medium, the computer program utilizing an ISO speed and a shutter speed to generate image data, which are to be output by a printer, and including
- program code for obtaining an image file, which includes the image data, the ISO speed and shutter speed, the ISO speed and shutter speed being associated with the image data by a digital still camera;
- program code for retrieving the ISO speed and shutter speed from the obtained image file; and
- program code that, in the case of successful retrieval of the ISO speed and shutter speed, carries out image processing of the image data by determining a noise reduction level based on the ISO speed and changing the determined noise reduction level based on the shutter speed.

6. A method of carrying out noise reduction processing comprising:
- acquiring an image file including image data, an ISO speed and shutter speed information from a digital still camera, wherein the ISO speed and shutter speed information are associated with the image data by the digital still camera; and
- carrying out noise reduction processing on the image data included in the acquired image file based on the ISO speed and shutter speed information included in the image file, wherein the noise reduction processing is implemented by determining a noise reduction level based on the ISO speed and changing the determined noise reduction level based on the shutter speed information.

7. A method in accordance with claim 6, wherein an initial value of the noise reduction level is set by way of analyzing lightness in shooting.

* * * * *